US010010851B2

United States Patent
Hong et al.

(10) Patent No.: US 10,010,851 B2
(45) Date of Patent: Jul. 3, 2018

(54) ALL-IN-ONE-TYPE CONTINUOUS REACTOR FOR PREPARING POSITIVE ELECTRODE ACTIVE MATERIAL FOR LITHIUM SECONDARY BATTERY, AND CRYSTAL SEPARATION APPARATUS COMPRISING THE SAME

(75) Inventors: Jong Pal Hong, Seongnam-si (KR); Hee Wan Lee, Seongnam-si (KR); Kyung Woo Lee, Seongnam-si (KR); Eun Jeong Cho, Seongnam-si (KR)

(73) Assignee: LAMINAR CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/129,112

(22) PCT Filed: Jan. 17, 2012

(86) PCT No.: PCT/KR2012/000380
§ 371 (c)(1),
(2), (4) Date: Dec. 24, 2013

(87) PCT Pub. No.: WO2013/012147
PCT Pub. Date: Jan. 24, 2013

(65) Prior Publication Data
US 2014/0147338 A1    May 29, 2014

(30) Foreign Application Priority Data
Jul. 20, 2011   (KR) .................. 10-2011-0071775

(51) Int. Cl.
*B01J 19/18*   (2006.01)
*H01M 4/02*   (2006.01)
(Continued)

(52) U.S. Cl.
CPC ............... *B01J 19/004* (2013.01); *B01J 8/10* (2013.01); *B01J 8/20* (2013.01); *B01J 19/10* (2013.01);
(Continued)

(58) Field of Classification Search
CPC . B01J 19/18; H01M 4/02; H01M 4/13; G01B 9/04
(Continued)

(56) References Cited

U.S. PATENT DOCUMENTS 3,744,926 A * 7/1973 Hedges ..................... F01D 1/34
                                                                    415/92
8,617,480 B2 * 12/2013 Funaoka et al. .............. 422/225
(Continued)

FOREIGN PATENT DOCUMENTS

JP          2007085650 A  *   4/2007

OTHER PUBLICATIONS

Machine translation for JP-2007-085650 A—Feb. 6, 2015.*
IKA—2003 Process catalog.*

*Primary Examiner* — Huy-Tram Nguyen
(74) *Attorney, Agent, or Firm* — Novick, Kim & Lee, PLLC; Jae Youn Kim

(57) ABSTRACT

The present invention provides an all-in-one type continuous reactor for preparing a positive electrode active material for a lithium secondary battery. The continuous reactor includes a flange unit provided at one side of a cylinder; at least one reactant inlet port provided on the flange unit; a reaction product outlet port provided at the other side of the cylinder; a plurality of extra ports provided between the reactant inlet port and the reaction product outlet port; a temperature control unit disposed between an inner circumferential surface and outer circumferential surface; a pulverizing unit provided in the reactant inlet port; a flow rate sensor (Continued)

provided in at least one of the reactant inlet port; and a flow rate control unit configured to control the flow rate of the reactant.

15 Claims, 2 Drawing Sheets

(51) Int. Cl.
- *G01B 9/04* (2006.01)
- *B01J 19/00* (2006.01)
- *B01J 8/10* (2006.01)
- *B01J 8/20* (2006.01)
- *B01J 19/10* (2006.01)
- *G01B 15/08* (2006.01)
- *H01M 4/13* (2010.01)

(52) U.S. Cl.
CPC ....... *B01J 19/1812* (2013.01); *B01J 19/1843* (2013.01); *G01B 15/08* (2013.01); *H01M 4/13* (2013.01); *B01J 2208/00212* (2013.01); *B01J 2208/00548* (2013.01); *B01J 2219/00085* (2013.01); *B01J 2219/00094* (2013.01); *B01J 2219/00159* (2013.01); *B01J 2219/00164* (2013.01); *B01J 2219/00202* (2013.01); *B01J 2219/00211* (2013.01); *B01J 2219/00231* (2013.01)

(58) Field of Classification Search
USPC .................................................. 422/109, 110
See application file for complete search history.

(56) References Cited

U.S. PATENT DOCUMENTS

| | | | |
|---|---|---|---|
| 2003/0148097 A1* | 8/2003 | Takikawa et al. ............ | 428/364 |
| 2003/0181760 A1* | 9/2003 | Nakajima et al. ............ | 562/519 |
| 2007/0111098 A1* | 5/2007 | Yang Kook et al. .... | 429/231.95 |
| 2010/0234557 A1* | 9/2010 | Sato ..................... | B01J 19/1862 |
| | | | 528/354 |

* cited by examiner

US 10,010,851 B2

ALL-IN-ONE-TYPE CONTINUOUS REACTOR FOR PREPARING POSITIVE ELECTRODE ACTIVE MATERIAL FOR LITHIUM SECONDARY BATTERY, AND CRYSTAL SEPARATION APPARATUS COMPRISING THE SAME

TECHNICAL FIELD

The present invention relates to an all-in-one type continuous reactor for preparing a positive electrode active material for a lithium secondary battery and to a crystal separation apparatus comprising the same.

More particularly, the present invention relates to an all-in-one type continuous reactor for preparing a positive electrode active material for a lithium secondary battery, wherein a temperature control unit, a particle size control unit and a flow rate control unit are integrally provided so that a series of processes for obtaining a high-purity reaction product can be carried in the reactor, and to a crystal separation apparatus comprising the reactor.

BACKGROUND ART

Reactors are devices in which two or more different materials are allowed to react with each other at a certain temperature and pressure in the presence of catalysts or the like to produce a product having a composition and structure different from those of the reactants. The reactors are classified into a continuous reactor and a batch-type reactor.

The continuous reactor is a device in which introduced reactants react with each other while flowing through the reactor and the reaction product is discharged through an outlet, and the batch-type reactor is a device in which introduced reactants react with each other in a non-flowing state and the reaction product is recovered from the reactor.

Conventional continuous reactors have an advantage in that a product is recovered at a high rate. However, these reactors do not have means capable of controlling the size of the reaction product, and for this reason, in order to reduce or increase the size of the reaction product crystal, the reaction product should be further reacted in an additional device. Thus, these have disadvantages in terms of space and time.

In addition, conventional continuous reactors do not have a control unit for precisely controlling the amount of reaction solutions, and thus it is difficult for these reactors to precisely control the reaction solutions. For this reason, it is difficult for these rectors to achieve an accurate reaction, and thus the reaction product has low reliability.

DISCLOSURE

Technical Problem

Accordingly, the present invention has been in order to solve the above-described problems occurring in the prior art, and an object of the present invention is to provide an all-in-one type continuous reactor for preparing a positive electrode active material for a lithium secondary battery, wherein a temperature control unit, a particle size control unit and a flow rate control unit are integrally provided so that a series of processes for obtaining a high-purity reaction product (positive electrode active material) can be carried out in the reactor, and a crystal separation apparatus comprising the reactor.

Technical Solution

In order to accomplish the above object, in a first aspect, the present invention provides an all-in-one type continuous reactor for preparing a positive electrode active material for a lithium secondary battery, the continuous reactor comprising: a non-rotating cylinder 10 having a reaction chamber 11 therein; a stirring motor 20 disposed at one side of the cylinder 10; a stirring rod 30 coupled to a motor shaft 21 of the stirring motor 20 and included in the reaction chamber 11 so as to be spaced from the wall surface of the reaction chamber 11; a flange unit 12 provided at one side of the cylinder 10; at least one reactant inlet port 13 provided on the flange unit so as to communicate with the reaction chamber 11 and configured to introduce a reactant into the reaction chamber; a reaction product outlet port 14 provided at the other side of the cylinder 10 so as to communicate with the reaction chamber 11 and configured to discharge a reaction product from the reaction chamber; a plurality of extra ports 15 provided between the reactant inlet port 13 and the reaction product outlet port 14 so as to communicate with the reaction chamber 11; a temperature control unit 40 disposed between the inner circumferential surface and outer circumferential surface 10, the temperature control unit 40 comprising a ring-shaped refrigerant chamber 41 and a refrigerant 42 filled in the refrigerant chamber; a pulverizing unit 50 provided in the reactant inlet port 13 and configured to pulverize particles of the reactant that is introduced through the reactant inlet port; a flow rate sensor 60 provided in at least one of the reactant inlet port 13, the reaction product outlet port 14 and the extra ports 15 and configured to sense the flow rate of the reactant; and a flow rate control unit 70 configured to control the flow rate of the reactant, which is introduced through the reactant inlet port 13, on the basis of flow rate data sensed by the flow rate sensor 60.

In a second aspect, the present invention provides an all-in-one type continuous reactor for preparing a positive electrode active material for a lithium secondary battery, the continuous reactor comprising: a non-rotating cylinder 10 having a reaction chamber 11 therein; a stirring motor 20 disposed at one side of the cylinder 10; a stirring rod 30 coupled to a motor shaft 21 of the stirring motor 20 and included in the reaction chamber 11 so as to be spaced from the wall surface of the reaction chamber 11; a plurality of flange units 12 provided on the cylinder 10 so as to be spaced from each other; at least one reactant inlet port 13 provided on each of the flange units so as to communicate with the reaction chamber 11 and configured to introduce a reactant into the reaction chamber; a reaction product outlet port 14 provided at the other side of the cylinder 10 so as to communicate with the reaction chamber 11 and configured to discharge a reaction product from the reaction chamber; a plurality of extra ports 15 provided between the reactant inlet port 13 and the reaction product outlet port 14 so as to communicate with the reaction chamber 11; a temperature control unit 40 disposed between the inner circumferential surface and outer circumferential surface 10, the temperature control unit 40 comprising a ring-shaped refrigerant chamber 41 and a refrigerant 42 filled in the refrigerant chamber; a pulverizing unit 50 provided in the reactant inlet port 13 and configured to pulverize particles of the reactant that is introduced through the reactant inlet port; a flow rate sensor 60 provided in at least one of the reactant inlet port 13, the reaction product outlet port 14 and the extra ports 15 and configured to sense the flow rate of the reactant; and a flow rate control unit 70 configured to control the flow rate of the reactant, which is introduced through the reactant inlet port 13, on the basis of flow rate data sensed by the flow rate sensor 60.

In a third aspect, the present invention provides a crystal separation apparatus comprising: an all-in-one type continuous reactor as described above; a plurality of reactant storage tanks 100 connected by connection lines L1, L2 and L3 to a plurality of reactant inlet ports 13 provided on a flange unit 12 of the continuous reactor; supply pumps 200 provided in the connection lines L1, L2 and L3, respectively, and configured to introduce reactants from the reactant storage tanks 100 into a reaction chamber 11 of the continuous reactor by pumping; a positive electrode active material separator 300 connected with a reaction product outlet port of the continuous reactor and configured to separate a slurry-type reaction product, which is discharged through the outlet port 14, into the positive electrode active material and a liquid; and a dryer 400 connected with the positive electrode active material separator 300 and configured to dry the positive electrode active material separated by the positive electrode active material separator 300.

Advantageous Effects

According to the present invention, a temperature control unit, a particle size control unit and a flow ate control unit are integrally provided in a single reactor so that a series of processes for obtaining a high-purity reaction product can be the reactor. Thus, the reactor according to the present invention is efficient and cost-effective.

BEST MODE

Figure 1:
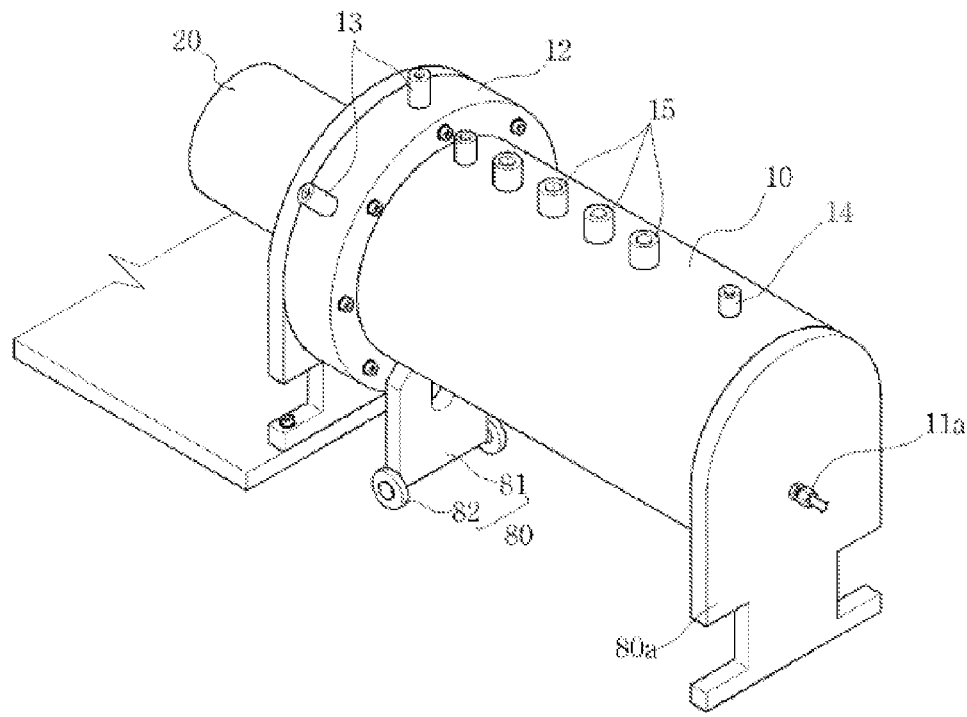
FIG. 1 is a perspective view of an all-in-one type continuous reactor according to a first embodiment of the present invention.

Hereinafter, embodiments according to the present invention will be described. In the following description, like reference numerals indicate like elements, and an overlapping description of components or an additional description causing the scope of the present invention to be construed in a limited sense will be omitted.

The disclosed embodiments are provided to enable those skilled in the art to easily understand the present invention and are not intended to limit the scope of the present invention. The embodiments of the present invention may be modified into other forms within the technical idea and scope of the present invention. As used herein, the term "and/or" is meant to include at least one of components listed before and after the term "and/or". When one element is referred to as being on another element, it can be directly on the other element or intervening elements may be present therebetween. Although the terms "first", "second", etc. may be used herein to clearly express various elements, these elements should not be limited by these terms. The thickness and relative thickness of elements shown in the figures may be exaggerated in order to clearly describe the embodiments of the present invention. In addition, features shown in the figures are shown to easily describe the embodiments of the present invention and may differ from actual features.

Figure 2:
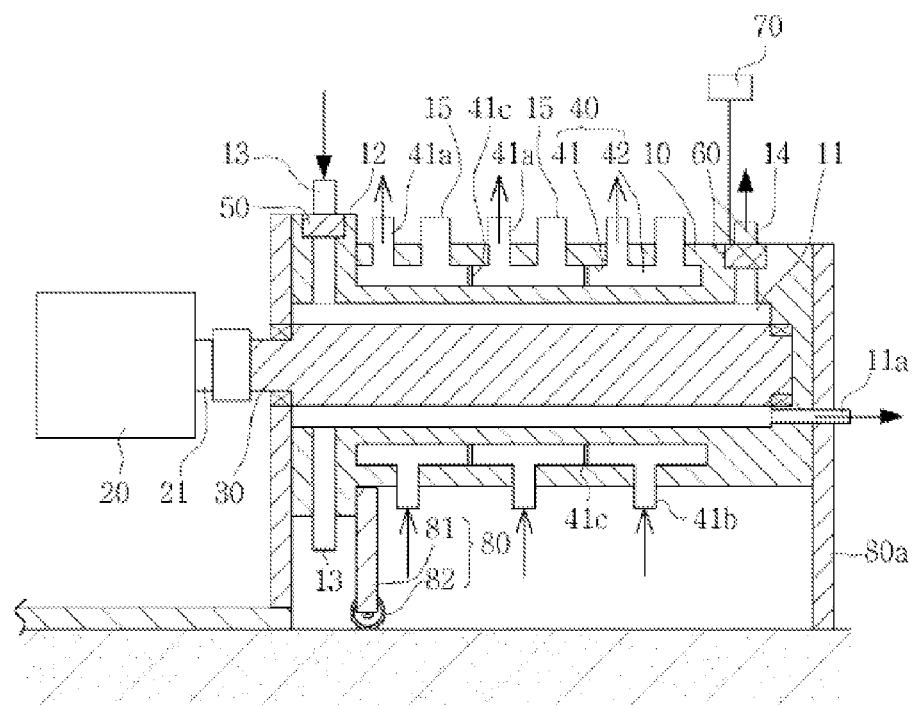
FIG. 2 is a longitudinal sectional view of the continuous reactor shown in FIG. 1.

FIG. 1 is a perspective view of an all-in-one type continuous reactor according to a first embodiment of the present invention, and FIG. 2 is a longitudinal sectional view of the continuous reactor shown in FIG. 1.

Referring to FIGS. 1 and 2, an all-in-one type continuous reactor (hereinafter abbreviated as "reactor") according to the present invention generally comprises: a non-rotating cylinder 10 having a reaction chamber 11 therein; a stirring motor 20 disposed at one side of the cylinder 10; and a stirring rod 30 coupled to a motor shaft 21 of the stirring motor 20 and included in the reaction chamber 11 so as to be spaced from the wall surface of the reaction chamber 11.

In addition, the reactor of the present invention further comprises: a flange unit 12 provided at one side of the cylinder 10; a reactant inlet port 13 provided on the flange unit so as to communicate with the reaction chamber 11 and configured to introduce a reactant into the reaction chamber; and a reaction product outlet port 14 provided at the other side of the cylinder 10 so as to communicate with the reaction chamber 11 and configured to discharge a reaction product from the reaction chamber.

Herein, a plurality of the reactant inlet port 13 may be radially arranged along the outer circumference of the flange unit 12.

Reference numeral 11a indicates a reactant drain port serving to clean a reactant from the reactor when cleaning the reactor.

Figure 3:
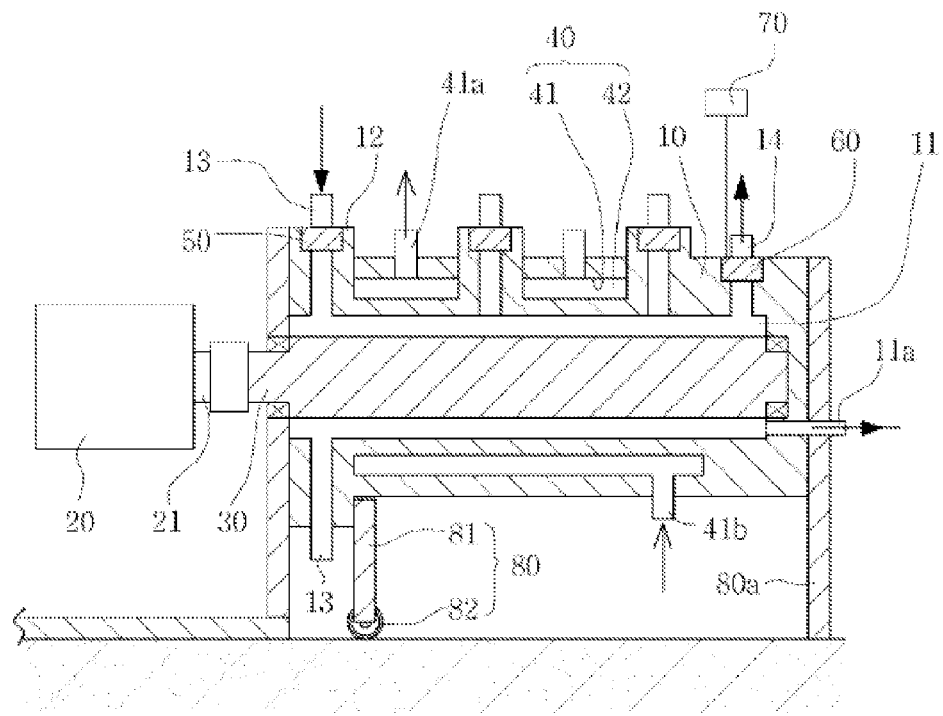
FIG. 3 is a perspective view of an all-in-one type continuous reactor according to a second embodiment of the present invention.
Figure 4:
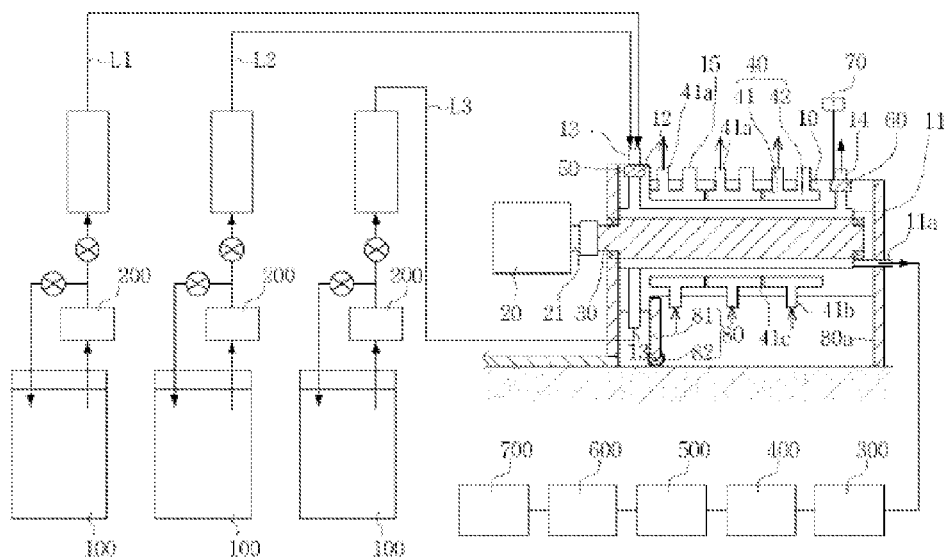
FIG. 4 shows the configuration of a crystal separation apparatus according to the present invention.

As shown in FIG. 3, in the reactor of the present invention, a plurality of the flange units 12 may also be provided on the outer circumference of the cylinder 10 at a predetermined distance from each other, and each of the flange units 12 may have the reactant inlet port 13. This configuration enables different reactants to be introduced through the reactant inlet ports 13 of the flange units 12. When the stirring rod 30 is rotated, the mixing rate of the reactants that are introduced through the reactant inlet port 13 is lower in the direction of the stirring rod 30 and higher in the radial direction. Thus, when there is a flow in the direction of the stirring rod 30, mixing between cells occurs, but a fluid near the stirring rod 30 tends to move toward the inner wall of the cylinder 10 fixed by the centrifugal force. Due to this unstable fluid, ring-shaped Taylor vortices are formed which rotate in opposite directions in the direction of the stirring rod 30. This Taylor flow can be easily generated by changing the rotating speed of the stirring rod, and thus the stability of the fluid can be used.

The stirring motor 20 is a speed-changeable stirring motor whose rotating speed can be controlled in the range from 10 to 2000 rpm. Thus, the rotating speed of the stirring rod 30 connected directly thereto can also be changed in the above range to cause vortices in the reactant.

The ratio of the gap (g) between the inner circumferential surface of the reaction chamber 11 and the outer circumferential surface of the stirring rod 30 to the radius (d) of the stirring rod 30, that is, g/d, is preferably 1.0 or smaller. If the ratio is greater than 1.0, vortices in the reactant flowing in the reaction chamber 11 will not be generated or will be insufficient, and thus stirring of the reactant will be insufficient.

Between the reactant inlet port 13 of the cylinder 10 and the reaction product outlet port 14, a plurality of extra ports may be provided so as to communicate with the reaction chamber 11. The extra ports can be used for various purposes, and for example, the extra ports can be used as reactant inlet ports, or a flow rate sensor as described below can be placed in the extra ports, or the reactant can be sampled through the extra ports, or the extra ports may also be closed with a blocking plate.

In addition, the reactor of the present invention may further comprise a temperature control unit 40 disposed in the wall portion of the cylinder 10. The temperature control unit 40 serves to increase or reduce the temperature of the reactant. In an embodiment of the present invention, the temperature control unit 40 may comprise a ring-shaped refrigerant chamber 41 formed in the wall portion of the cylinder 10 so as to surround the reaction chamber 11, and a high-temperature or low-temperature refrigerant 42 filled in the refrigerant chamber 41. In another embodiment of the present invention, the temperature control unit 40 may also comprise a spirally wound heating tube (not shown) placed in the cylinder 10 and a refrigerant filled in the wound heating tube. Herein, the temperature control unit 40 may serve to control the temperature of the reactant in the temperature ranging from room temperature to about 80±1° C.

Herein, the refrigerant chamber 41 may be divided into a plurality of regions by a barrier 41c as shown in FIG. 2 in order to control the temperature of the reactant in each of the divided regions.

Reference numeral 41a indicates a refrigerant inlet port, and reference numeral 41b indicates a refrigerant outlet port.

In addition, the reactor of the present invention may further comprise a pulverizing unit 50 provided in the reactant inlet port 13 and configured to pulverize particles of the reactant that is introduced through the reactant inlet port 13. The pulverizing unit may, for example, be an ultrasonic pulverizer. For reference, in the ultrasonic pulverizer, a frequency voltage of 50-60 Hz is converted to high-frequency electrical energy of 20 kHz or higher in a generator, and the high-frequency electrical energy is converted into mechanical vibrations by a piezoelectric ceramic material in a convertor, and this conversion is referred to as inverse piezoelectric effect. The resulting vertical vibrations are transferred to a liquid sample. Due to constant amplitude and at least 20,000 vibrations/sec of a probe (or tip) that transfers the ultrasonic vertical vibrations to the liquid sample, expansion (negative pressure) and shrinkage (positive pressure) occur in the sample, and microscopic bubbles generated in this expansion/shrinkage process are intensively collapsed during expansion. This is referred to as cavitation (the rapid formation and collapse of microscopic bubbles in a liquid). At this time, shock waves having a pressure of about 1000 bar and an instantaneous temperature of about 5000 K are generated, and these waves act as a very high energy source to pulverize sample particles.

In addition, the reactor of the present invention may further comprise a flow rate sensor 60 provided in at least one of the reactant inlet port 13, the reaction product outlet port 14 and the extra ports 15 and configured to sense the flow rate of the reactant. Additionally, the reactor of the present invention may further comprise a flow rate control unit 70 configured to control either the flow rate of the reactant that is introduced through the reactant inlet port 13 or the flow rate of the reactant passing through the reaction chamber 11 or the flow rate of the reaction product that is discharged through the reaction product outlet port 14, based on flow rate data sensed by the flow rate sensor 60.

By means of the flow rate sensor 60 and the flow rate control unit 70, the flow rate of the reactant passing through the reactor can be controlled according to the user's intention, and the flow rate can be maintained at a constant level.

The reactor of the present invention is supported by a plate-shaped first supporter 80 and second supporter 80a at the side of the cylinder 10 where the stirring motor 10 is disposed and the side opposite thereto. Herein, the first supporter 80 consists of a support panel 81 and a roller 82 provided at the bottom of the support panel 81. Thus, the reactor of the present invention can be conveniently moved using the roller 82.

The inventive reactor as described above may contain a metal solution (containing Ni, Mn and Co), $NH_4OH$ and NaOH as reactants for preparing a positive electrode active material for a lithium secondary battery. Alternatively, the reactor may contain lithium hydroxide LiOH, ferrous sulfate ($FeSO_4$) and phosphoric acid ($H_3PO^4$). When these reactants are allowed to react with each other in the reactor, a precursor of a positive electrode active material for a lithium secondary battery is obtained.

Meanwhile, a crystal separation apparatus according to the present invention comprises the reactor of the present invention.

In addition, the crystal separation apparatus according to the present invention comprises a plurality of reactant storage tanks 100 connected by connection lines L1, L2 and L3 to a plurality of reactant inlet ports 13 provided on the flange unit 12 of the reactor. Herein, the reactant storage tanks 100 are configured to store the metal solution (that is a mixture containing Ni, Mn and Co), $NH_4$, OH and NaOH.

In addition, the crystal separation apparatus according to the present invention comprises supply pumps 200 provided in the connection lines L1, L2 and L3, respectively, and configured to introduce reactants from the reactant storage tanks 100 into the reaction chamber 11 of the continuous reactor by pumping. The supply pumps 200 have a pump pressure of 2 bar or higher and may be pulseless pumps whose pumping flow rate does not change even when being used for a long period.

In addition, the crystal separation apparatus according to the present invention may further comprise a positive electrode active material separator 300 connected with a reaction product outlet port of the continuous reactor and configured to separate a slurry-type reaction product, which is discharged through the outlet port 14, into the positive electrode active material and a liquid. Herein, the positive electrode active material separator may be a centrifuge or a dehydrator.

In addition, the crystal separation apparatus according to the present invention may further comprise a dryer 400 and a particle size analyzer 500 provided following the dryer 400 and configured to analyze the particle size distribution and particle size of the dried positive electrode active material.

In addition, the crystal separation apparatus according to the present invention may further comprise a scanning electron microscope 600 provided following the particle size analyzer 500 and configured to analyze the particle shape and particle size uniformity of the positive electrode active material. Herein, the scanning electron microscope 600 is used to observe a sample by detecting secondary electrons or back scattered electrons among various signals that are generated when an electron beam is scanned across the sample surface.

In addition, the crystal separation apparatus according to the present invention may further comprise a dryer 400 connected with the positive electrode active material separator 300 and configured to dry the positive electrode active material separated by the positive electrode active material separator 300.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An all-in-one type continuous reactor for preparing a positive electrode active material for a lithium secondary battery, the continuous reactor comprising:
   a non-rotating cylinder having a reaction chamber therein;
   a stirring motor disposed at one side of the cylinder;
   a stirring rod coupled to a motor shaft of the stirring motor and included in the reaction chamber so as to be spaced from the wall surface of the reaction chamber;
   a flange unit provided at one side of the cylinder;
   at least one reactant inlet port provided on the flange unit so as to communicate with the reaction chamber and configured to introduce a reactant into the reaction chamber;
   a reaction product outlet port provided at the other side of the cylinder so as to communicate with the reaction chamber and configured to discharge a reaction product from the reaction chamber;
   a plurality of extra ports provided between the at least one reactant inlet port and the reaction product outlet port so as to communicate with the reaction chamber;
   a temperature control unit disposed between the inner circumferential surface and outer circumferential surface of the non-rotating cylinder, the temperature control unit comprising a ring-shaped refrigerant chamber and a refrigerant filled in the refrigerant chamber;
   a pulverizing unit provided in the at least one reactant inlet port and configured to pulverize particles of the reactant that is introduced through the at least one reactant inlet port;
   a flow rate sensor provided in at least one of the at least one reactant inlet port, the reaction product outlet port and the extra ports and configured to sense the flow rate of the reactant; and
   a flow rate control unit configured to control the flow rate of the reactant, which is introduced through the at least one reactant inlet port, on the basis of flow rate data sensed by the flow rate sensor,
   wherein the ratio of a gap between the inner circumferential surface of the reaction chamber and the outer circumferential surface of the stirring rod to the radius of the stirring rod is 1.0 or smaller.

2. The all-in-one type continuous reactor of claim 1, wherein the stirring motor is a speed-changeable stirring motor whose rotating speed is changeable in the range of 10 to 2000 rpm.

3. The all-in-one type continuous reactor of claim 1, wherein the reactant comprises a metal solution, $NH_4OH$ and NaOH.

4. The all-in-one type continuous reactor of claim 3, wherein the metal solution is a mixture solution containing Ni, Mn and Co.

5. The all-in-one type continuous reactor of claim 1, wherein the reactant comprises LiOH, $FeSO_4$ and $H_3PO_4$.

6. An all-in-one type continuous reactor for preparing a positive electrode active material for a lithium secondary battery, the continuous reactor comprising:
   a non-rotating cylinder having a reaction chamber therein;
   a stirring motor disposed at one side of the cylinder;
   a stirring rod coupled to a motor shaft of the stirring motor and included in the reaction chamber so as to be spaced from the wall surface of the reaction chamber;
   a plurality of flange units provided on the cylinder so as to be spaced from each other; at least one reactant inlet port provided on each of the flange units so as to communicate with the reaction chamber and configured to introduce a reactant into the reaction chamber;
   a reaction product outlet port provided at the other side of the cylinder so as to communicate with the reaction chamber and configured to discharge a reaction product from the reaction chamber;
   a plurality of extra ports provided between the at least one reactant inlet port and the reaction product outlet port so as to communicate with the reaction chamber;
   a temperature control unit disposed between the inner circumferential surface and outer circumferential surface of the non-rotating cylinder, the temperature control unit comprising a ring-shaped refrigerant chamber and a refrigerant filled in the refrigerant chamber;
   a pulverizing unit provided in the at least one reactant inlet port and configured to pulverize particles of the reactant that is introduced through the at least one reactant inlet port;
   a flow rate sensor provided in at least one of the at least one reactant inlet port, the reaction product outlet port and the extra ports and configured to sense the flow rate of the reactant; and
   a flow rate control unit configured to control the flow rate of the reactant, which is introduced through the at least one reactant inlet port, on the basis of flow rate data sensed by the flow rate sensor;
   wherein the ratio of a gap between the inner circumferential surface of the reaction chamber and the outer circumferential surface of the stirring rod to the radius of the stirring rod is 1.0 or smaller.

7. A crystal separation apparatus comprising: an all-in-one type continuous reactor, comprising:
   a non-rotating cylinder having a reaction chamber therein;
   a stirring motor disposed at one side of the cylinder;
   a stirring rod coupled to a motor shaft of the stirring motor and included in the reaction chamber so as to be spaced from the wall surface of the reaction chamber;
   a flange unit provided at one side of the cylinder; at least one reactant inlet port provided on the flange unit so as to communicate with the reaction chamber and configured to introduce a reactant into the reaction chamber;
   a reaction product outlet port provided at the other side of the cylinder so as to communicate with the reaction chamber and configured to discharge a reaction product from the reaction chamber;
   a plurality of extra ports provided between the at least one reactant inlet port and the reaction product outlet port so as to communicate with the reaction chamber;
   a temperature control unit disposed between the inner circumferential surface and outer circumferential surface of the non-rotating cylinder, the temperature control unit comprising a ring-shaped refrigerant chamber and a refrigerant filled in the refrigerant chamber;
   a pulverizing unit provided in the at least one reactant inlet port and configured to pulverize particles of the reactant that is introduced through the at least one reactant inlet port a flow rate sensor provided in at least one of the at least one reactant inlet port, the reaction product outlet port and the extra ports and configured to sense the flow rate of the reactant; and a flow rate control unit configured to control the flow rate of the reactant, which is introduced through the at least one reactant inlet port, on the basis of flow rate data sensed by the flow rate sensor;

a plurality of reactant storage tanks connected by connection lines L1, L2 and L3 to a plurality of reactant inlet ports provided on a flange unit of the continuous reactor;

supply pumps provided in the connection lines L1, L2 and L3, respectively, and configured to introduce reactants from the reactant storage tanks into a reaction chamber of the continuous reactor by pumping;

a positive electrode active material separator connected with a reaction product outlet port of the continuous reactor and configured to separate a slurry-type reaction product, which is discharged through the outlet port, into the positive electrode active material and a solution; and a dryer connected with the positive electrode active material separator 300 and configured to dry the positive electrode active material separated by the positive electrode active material separator, wherein the ratio of a gap between the inner circumferential surface of the reaction chamber and the outer circumferential surface of the stirring rod to the radius of the stirring rod is 1.0 or smaller.

8. The crystal separation apparatus of claim 7, wherein the positive electrode active material separator is a centrifuge or a dehydrator.

9. The crystal separation apparatus of claim 7, further comprising a particle size analyzer provided following the dryer and configured to analyze the particle size distribution and particle size of the active electrode active material dried by the dryer.

10. The crystal separation apparatus of claim 9, further comprising a scanning electron microscope provided following the particle size analyzer and configured to analyze the particle shape and particle size uniformity of the active electrode active material.

11. The crystal separation apparatus of claim 10, further comprising a densitometer provided following the scanning electron microscope and configured to measure the density of the active electrode active material.

12. The all-in-one type continuous reactor of claim 7, wherein the stirring motor is a speed-changeable stirring motor whose rotating speed is changeable in the range of 10 to 2000 rpm.

13. The all-in-one type continuous reactor of claim 7, wherein the reactant comprises a metal solution, $NH_4OH$ and NaOH.

14. The all-in-one type continuous reactor of claim 13, wherein the metal solution is a mixture solution containing Ni, Mn and Co.

15. The all-in-one type continuous reactor of claim 7, wherein the reactant comprises LiOH, $FeSO_4$ and $H_3PO_4$.

* * * * *